US007804191B2

(12) United States Patent
Su

(10) Patent No.: US 7,804,191 B2
(45) Date of Patent: Sep. 28, 2010

(54) METHOD AND SYSTEM FOR COLLECTIVE CONTROL OF LIGHTS

(76) Inventor: Keng Kuei Su, 7F-2, No. 286-8, Hsin-Ya Road, Chien-Chen District, Kaohsiung City (TW)

( * ) Notice: Subject to any disclaimer, the term of this patent is extended or adjusted under 35 U.S.C. 154(b) by 1284 days.

(21) Appl. No.: 11/337,581

(22) Filed: Jan. 24, 2006

(65) Prior Publication Data

US 2006/0175988 A1 Aug. 10, 2006

(30) Foreign Application Priority Data

Feb. 5, 2005 (TW) .............................. 94103871 A

(51) Int. Cl.
*H02J 3/14* (2006.01)
*H05B 39/04* (2006.01)

(52) U.S. Cl. ......................................... 307/40; 315/317

(58) Field of Classification Search ............. 307/38–40; 315/186, 210, 317; 362/223
See application file for complete search history.

(56) References Cited

U.S. PATENT DOCUMENTS 4,695,739 A * 9/1987 Pierce ........................ 307/141
5,001,398 A * 3/1991 Dunn .......................... 315/77
5,182,494 A * 1/1993 Segaud ........................ 315/80
5,530,322 A * 6/1996 Ference et al. .............. 315/295
6,774,582 B1 * 8/2004 Kwong et al. ............... 315/293
7,135,966 B2 * 11/2006 Becattini .................... 340/531

* cited by examiner

*Primary Examiner*—Albert W Paladini
(74) *Attorney, Agent, or Firm*—Rosenberg, Klein & Lee

(57) ABSTRACT

A method for collective control of lights comprises connecting a positive output and a negative output of a main control device (1) by a wire to form a closed output circuit (4); independently connecting each of a plurality of lights (2) to an auxiliary control device (3); coupling a transducer (31) of each auxiliary control device with the output circuit; encoding each light (2); and inputting a code number of a light to be controlled to the main control device, the main control device generating and outputting an encoded control signal in response to the code number, the encoded control signal passing through the wire of the output circuit, the transducer of an auxiliary control device in association with the light to be controlled generating a control signal in response to the encoded control signal, thereby controlling the lights. A system for collective control of lights is also disclosed.

5 Claims, 7 Drawing Sheets

METHOD AND SYSTEM FOR COLLECTIVE CONTROL OF LIGHTS

FIELD OF THE INVENTION

The present invention relates to a method for collective control of lights. The present invention also relates to a system for collective control of lights.

BACKGROUND OF THE INVENTION

A building such as an office building, a residential building, or a hotel includes a switching house in which a switchboard for knife switches is mounted. Common household electric current of hundreds of amperes is distributed to a plurality of output circuits after passing through the switchboard. A plurality of lights are connected in parallel in each output circuit. On/off of each light is controlled by a switch that is connected in series to the light, as shown in FIG. 1.

However, on/off of each light can only be controlled via the associated switch, which is relatively inconvenient. Further, the wiring procedure is troublesome and many switches are required for the control system, leading to a high equipment cost. Further, installation of the control system is complicated and thus results in a high cost. Further, maintenance of the control system is not easy.

SUMMARY OF THE INVENTION

An objective of the present invention is to provide a method for collective control of lights that allows easy control, easy installation, and easy maintenance at a low cost.

Another objective of the present invention is to provide a system for collective control of lights that allows easy control, easy installation, and easy maintenance at a low cost.

In accordance with a first aspect of the present invention, a method for collective control of lights comprises connecting a positive output of a main control device with a negative output of the main control device by a wire to form a closed output circuit; independently connecting each of a plurality of lights to an auxiliary control device; coupling a transducer of each auxiliary control device with the output circuit or connecting each auxiliary control device in series to the output circuit; encoding each light; and inputting a code number of a light to be controlled to the main control device, the main control device generating and outputting an encoded control signal in response to the code number, the encoded control signal passing through the wire of the output circuit, the transducer of one of the auxiliary control devices in association with the light to be controlled generating a control signal in response to the encoded control signal, thereby controlling the lights.

Preferably, the main control device controls on/off and current magnitude of each light.

Preferably, the step of encoding each light is based on an encoding system built in a central processor of the main control device or an additional memory.

In accordance with a second aspect of the present invention, a system for collective control of lights comprises a main control device and a plurality of lights. The system further comprises a plurality of auxiliary control devices a number of which is equal to that of the lights. Each auxiliary control device comprises a transducer, an amplifier, a decoder, and a switch device that are electrically connected in sequence. A main portion of a circuit of the switch device is electrically connected to an associated one of the lights or electrically connected via a switch device having a larger power to the associated one of the lights. The main control device comprises a central processor, an input/decoder, an encoded control signal generating circuit, and a main amplifier. The input/decoder and the encoded control signal generating circuit are electrically connected to the central processor. The encoded control signal generating circuit is electrically connected to the input/encoder and the main amplifier.

A positive output and a negative output of the main amplifier are connected with each other by a wire to form an output circuit. The transducer is coupled with the wire of the output circuit. A code number for the light to be controlled is input via the input/encoder to the central processor. The central processor controls the encoded control signal generating circuit to generate and output an encoded control signal. When the encoded control signal passes through the wire of the output circuit, the transducer of the auxiliary control device in association with the light to be controlled generates a corresponding encoded control signal that is amplified by the amplifier and output to the switch device after decoding by the decoder to control on/off of the switch device, thereby collectively controlling on/off and/or current magnitude of each of the lights.

Preferably, the transducer comprises an iron core wound by a coil, and the transducer is parallel to the output circuit.

Alternatively, the transducer comprises an iron core wound by a coil. The iron core is annular, and the wire of output circuit extends through a center of the annular iron core and extends on a plane orthogonal to a plane on which the iron core lies.

Preferably, the main control device further comprises a code number setting switch electrically connected to the central processor.

In accordance with a third aspect of the present invention, a method for collective control of lights comprises connecting a positive output of a main control device with a negative output of the main control device by a wire to form a closed output circuit; independently connecting each of a plurality of lights to an auxiliary control device; connecting a resistor of an RC circuit of each auxiliary control device in series to the output circuit; encoding each light; and inputting a code number of a light to be controlled to the main control device, the main control device generating and outputting an encoded control signal current in response to the code number, a voltage drop of the encoded control signal current passing through the resistor of the RC circuit of an associated one of the auxiliary control devices being output after decoding by the associated auxiliary control device, thereby controlling the lights.

In accordance with a fourth aspect of the present invention, a system for collective control of lights comprises a main control device and a plurality of lights. The system further comprises a plurality of auxiliary control devices a number of which is equal to that of the lights. Each auxiliary control device comprises an RC circuit, an amplifier, a decoder, and a switch device that are electrically connected in sequence. A main portion of a circuit of the switch device is electrically connected to an associated one of the lights.

The main control device comprises a central processor, an input/decoder, an encoded control signal generating circuit, and a main amplifier. The input/decoder and the encoded control signal generating circuit are electrically connected to the central processor. The encoded control signal generating circuit is electrically connected to the input/encoder and the main amplifier.

A positive output and a negative output of the main control device are connected with each other by a wire to form an output circuit. The RC circuit comprises a resistor connected in series to the output circuit. A code number for the light to be controlled is input via the input/encoder to the central processor. The central processor controls the encoded control signal generating circuit to generate and output an encoded control signal current. A voltage drop imparted to the resistor of the RC circuit of an associated one of the auxiliary control devices is amplified by the amplifier and output to the switch device after decoding by the decoder to control on/off of the switch device, thereby collectively controlling on/off and/or current magnitude of each of the lights.

Other objectives, advantages, and novel features of the invention will become more apparent from the following detailed description when taken in conjunction with the accompanying drawings.

DETAILED DESCRIPTION OF THE INVENTION

Figure 2:
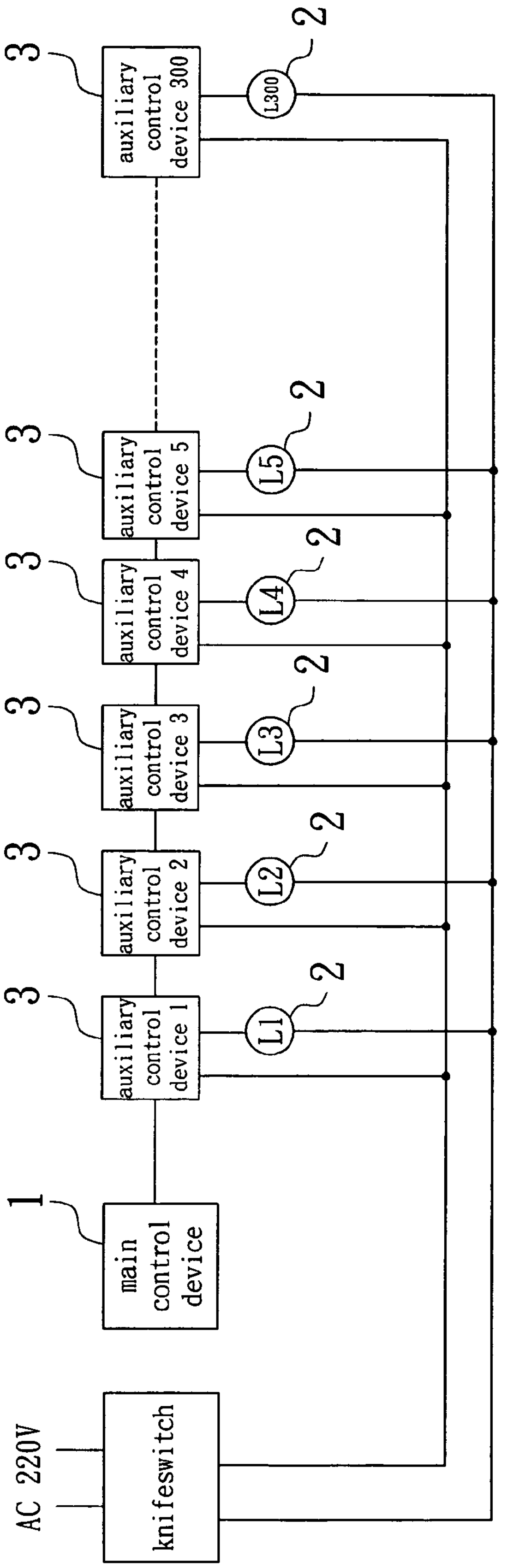
FIG. 2 is a schematic view illustrating a system for carrying out a method for collective control of lights in accordance with the present invention.
Figure 3:
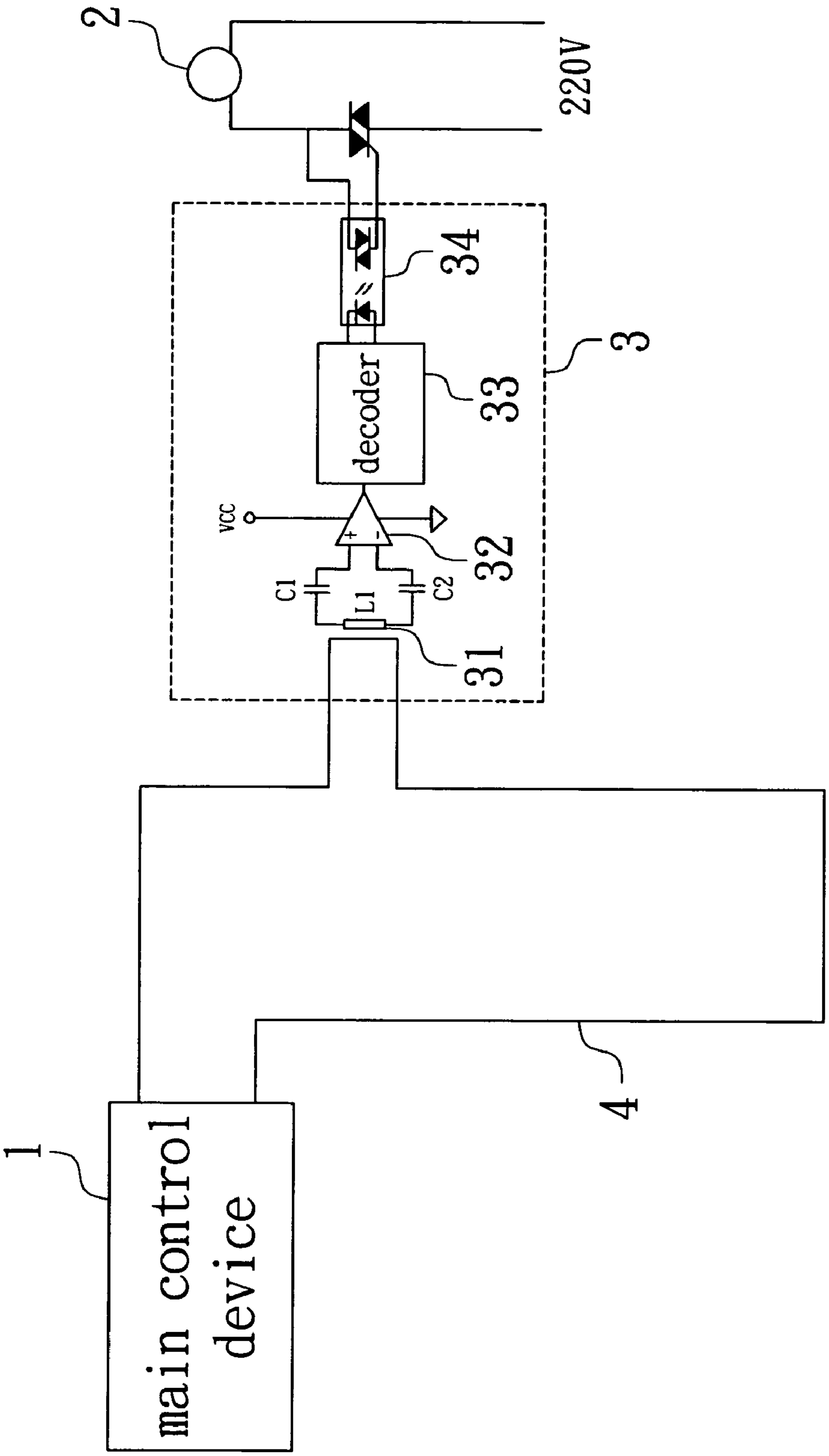
FIG. 3 is a schematic view illustrating an example of a system for collective control of lights in accordance with the present invention.

Referring to FIGS. 2 and 3, a method for collective control of lights in accordance with the present invention comprises (1) connecting a positive output of a main control device 1 with a negative output of the main control device 1 by a wire to form a closed output circuit 4, (2) independently connecting each of a plurality of lights 2 to an auxiliary control device 3, (3) coupling each auxiliary control device 3 with the output circuit 4 by a sensor or connecting each auxiliary control device 3 in series to the output circuit 4, (4) encoding each light 2 based on an encoding system built in a central processor of the main control device 1 or an additional memory (not shown), and (5) inputting a code number of a light 2 to be controlled to the main control device 1, the main control device 1 generating and outputting an encoded control signal in response to the code number, one of the auxiliary control devices 3 in association with the light 2 to be controlled decoding the encoded control signal and outputting a control signal for controlling on/off and current magnitude of the light 2 to be controlled.

Referring to FIGS. 2 and 3, a system for collective control of lights in accordance with the present invention comprises a main control device 1, a plurality of lights 2, and a corresponding number of auxiliary control devices 3 (i.e., the number of the auxiliary control devices 3 is equal to that of the lights 2). Each auxiliary control device 3 comprises a transducer 31, an amplifier 32, a decoder 33, and a switch device 34 that are electrically connected in sequence. A main portion of the circuit of the switch device 34 is electrically connected to the associated light 2.

Figure 1:
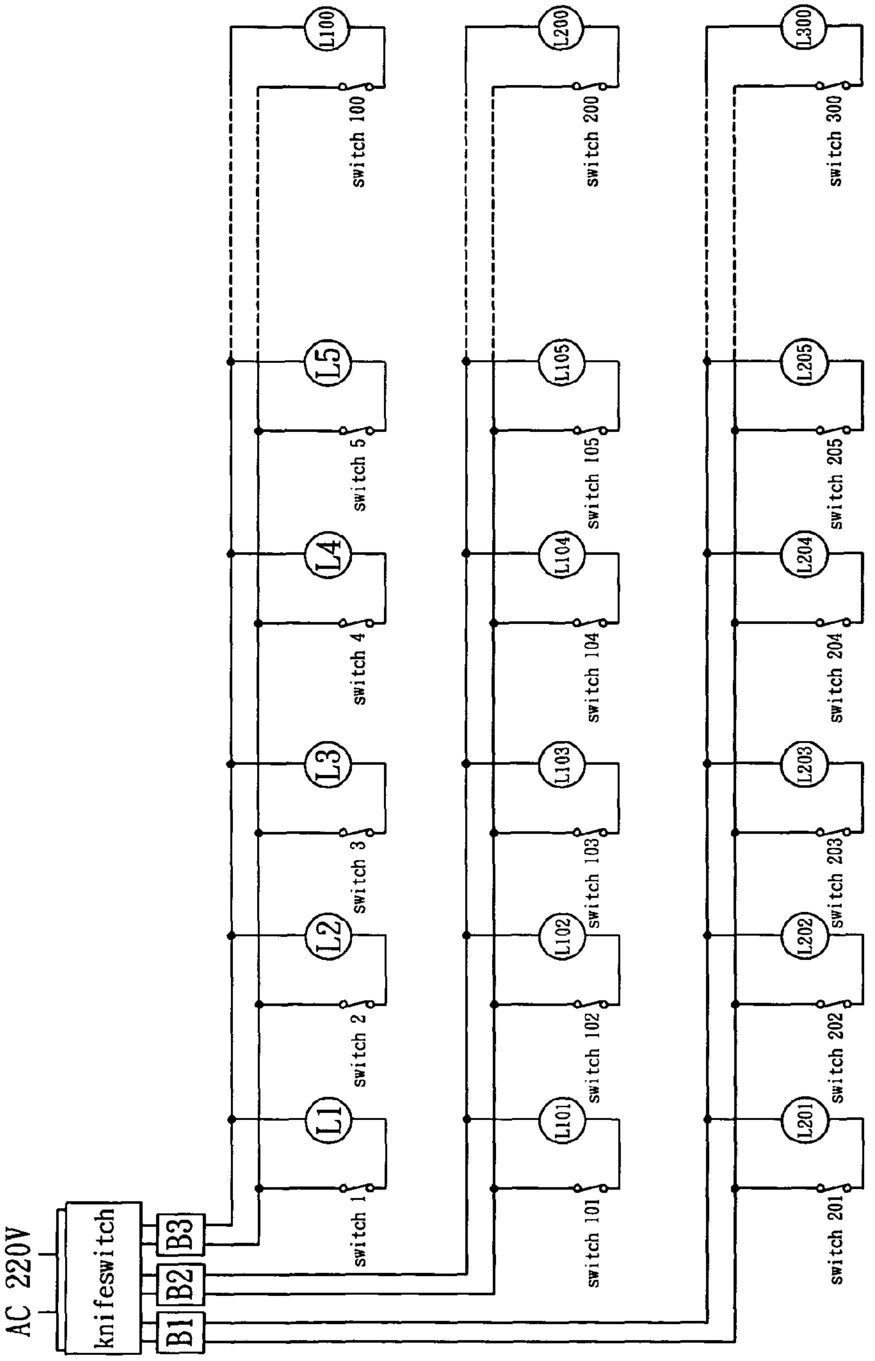
PRIOR ART FIG 1
FIG. 1 is a schematic view illustrating a conventional system for control lights.
Figure 6:
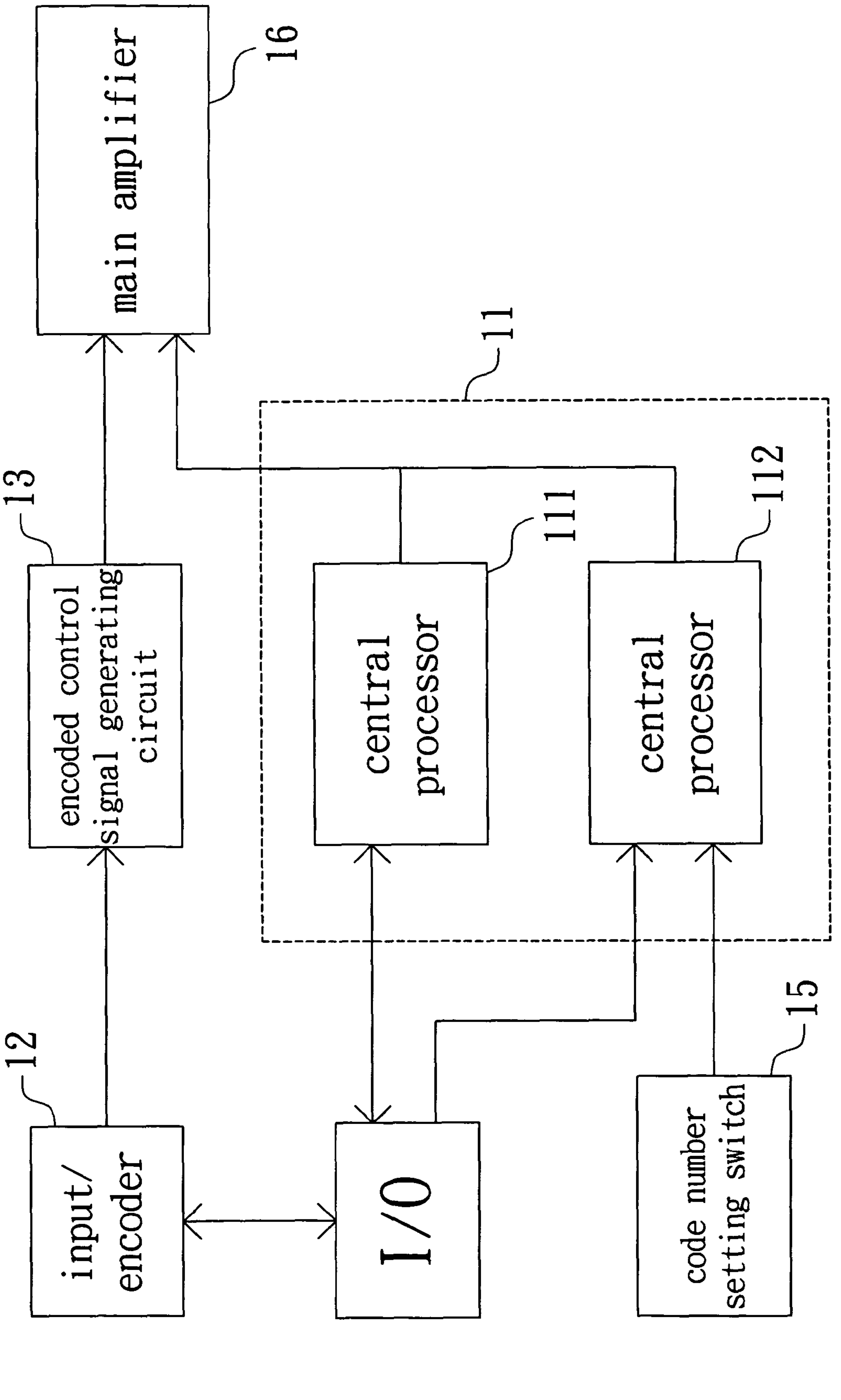
FIG. 6 is a schematic block diagram illustrating a main control device of the system for collective control of lights in accordance with the present invention.
Figure 7:
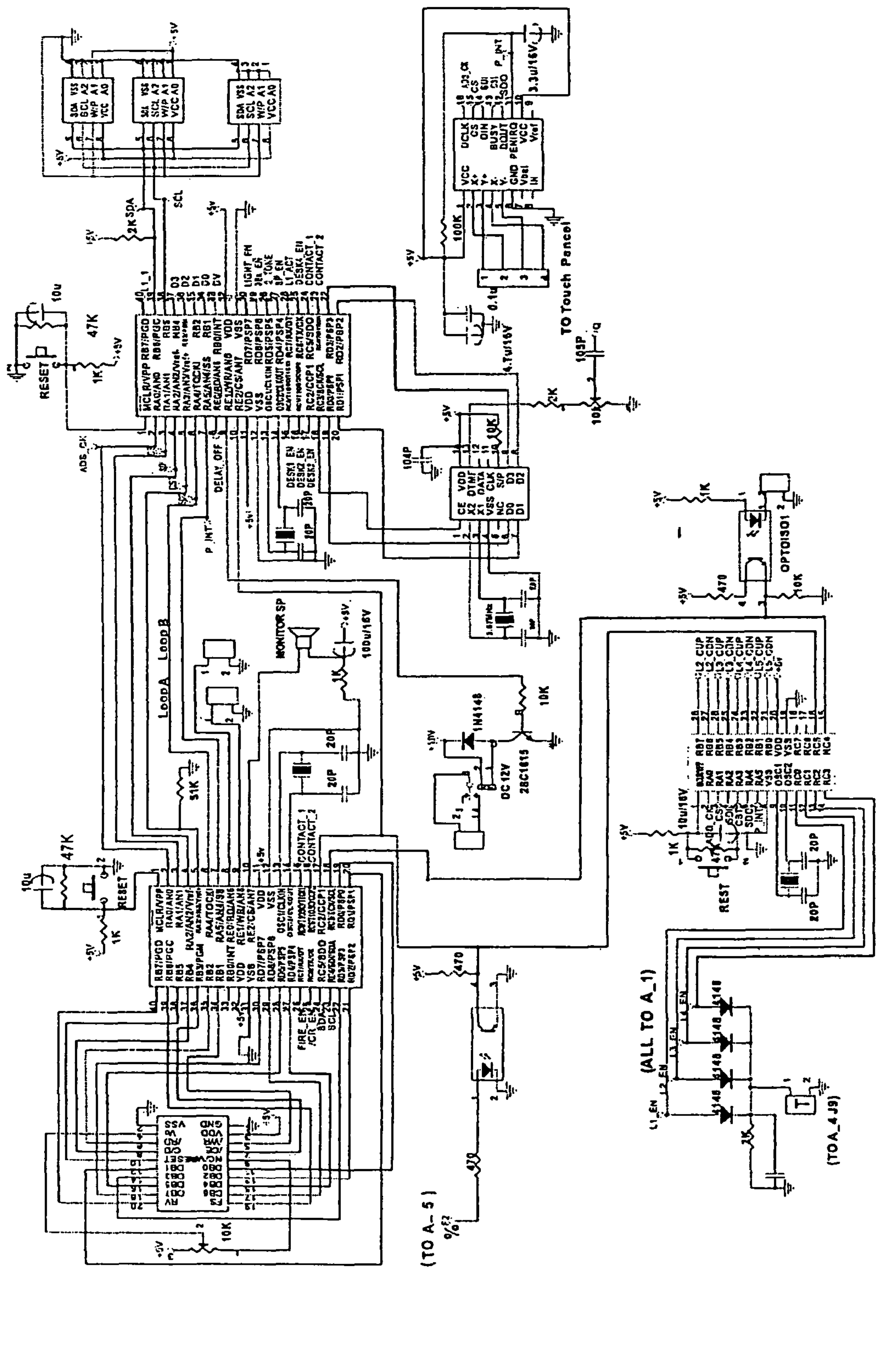
FIG. 7 is a schematic circuitry of the main control device of the system for collective control of lights in accordance with the present invention.

Referring to FIGS. 1 and 6, the main control device 1 comprises a central processor 11, an input/encoder 12, an encoded control signal generating circuit 13, a code number setting switch 15, and a main amplifier 16. The input/encoder 12, the encoded control signal generating circuit 13, and the code number setting switch 15 are electrically connected to the central processor 11. Further, the encoded control signal generating circuit 13 is electrically connected to the input/encoder 12 and the main amplifier 16. The input/encoder 12 is a touch-type liquid crystal display. The central processor 11 comprises two chips 111 and 112, wherein the chip 111 processes information input through the touch-type liquid crystal display and displays the information, and the chip 112 temporarily stores the information in a database and calculates and handles the information stored in the database. FIG. 7 illustrates a circuitry of the main control device 1.

Referring to FIGS. 2 and 6, a positive output and a negative output of the main amplifier 16 are connected with each other by a wire to form an output circuit 4. The transducer 31 is coupled with the wire of the output circuit 4. Code number for the light 2 to be controlled is input via the input/encoder 12 to the central processor 11. The central processor 11 controls the encoded control signal generating circuit 13 to generate and output an encoded control signal current. When the current signal passes through the wire of the output circuit 4, the transducer 31 of the auxiliary control device 3 in association with the light 2 to be controlled generates an induction current that is amplified by the amplifier 32 and output to the switch device 34 after decoding by the decoder 33. On/off of the switch device 34 is thus controlled. Alternatively, another switch device with a greater power can be used to control on/off and power of the main circuit. On/off illumination intensity of each light 2 can thus be controlled collectively.

Referring to FIG. 3, in an example of the invention, the switch device 34 is a photo-control bi-directional transistor. The transducer 31 includes an iron core wound by a coil and is parallel to the wire of the output circuit 4. Alternatively, the iron core is annular, and the wire of the output circuit 4 extends through a center of the annular iron core and extends on a plane that is orthogonal to a plane on which the iron core lies.

Figure 4:
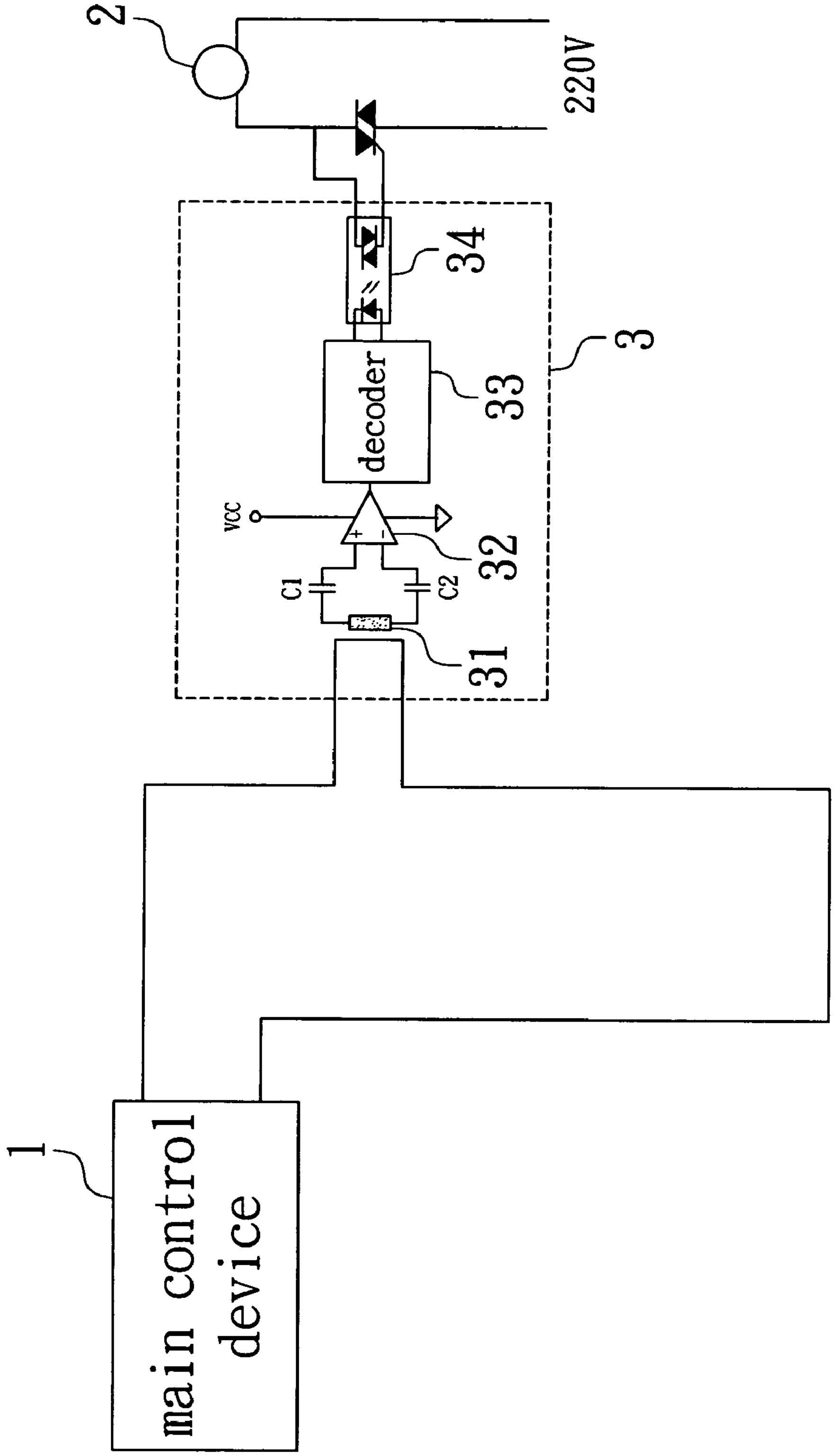
FIG. 4 is a schematic view illustrating another example of the system for collective control of lights in accordance with the present invention.

FIG. 4 illustrates another example of the invention, wherein the transducer 31 is a Hall element.

Figure 5:
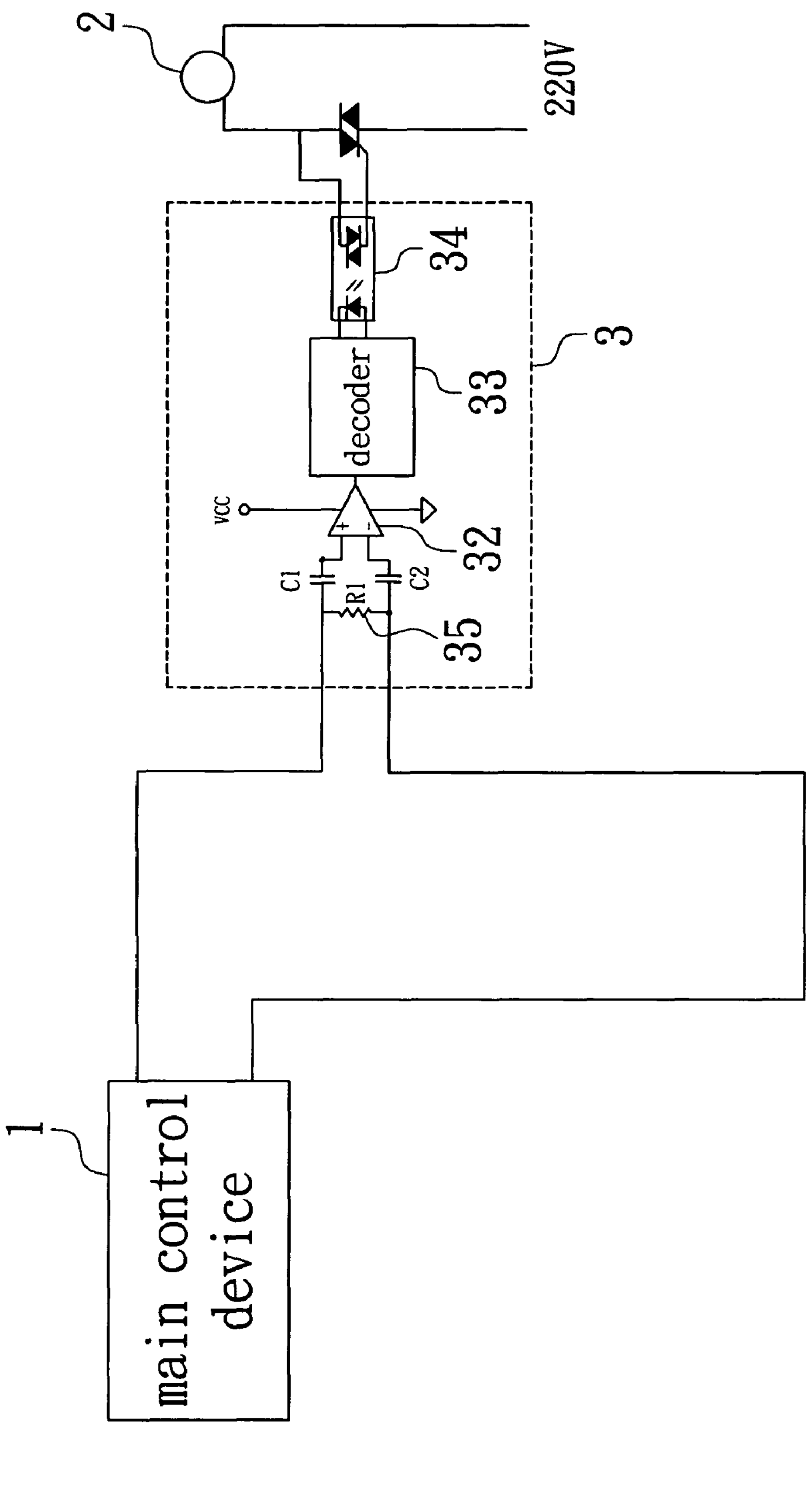
FIG. 5 is a schematic view illustrating a further example of the system for collective control of lights in accordance with the present invention.

FIG. 5 illustrates a further example of the invention, wherein the system for collective control of lights comprises a main control device 1, a plurality of lights 2, and a corresponding number of auxiliary control devices 3. Each auxiliary device 3 comprises in sequence an RC circuit 35, an amplifier 32, a decoder 33, and a switch device 34 electrically connected to an associated light 2. The switch device 34 is a photo-control bi-directional transistor.

The main control device 1 is substantially the same as that in each of the above-mentioned examples.

More specifically, a positive output and a negative output of the main control device 1 are connected to each other by, a wire to form an output circuit 4. A resistor R1 of the RC circuit 35 is connected in series with the output circuit 4. Code number for the light 2 to be controlled is input via the input/encoder 12 to the central processor 11. The central processor 11 controls the encoded control signal generating circuit 13 to generate and output an encoded control signal current. The current distributed to the resistor R1 passes through and is amplified by the amplifier 32 and output to the switch device 34 after decoding by the decoder 33. On/off of the switch device 34 is thus controlled. On/off and illumination intensity of each light 2 can thus be controlled collectively.

As apparent from the foregoing, on/off and the illumination intensity of each light 2 can be collectively controlled. The control can be remotely carried out by the input/encoder 12 of the main control device 1, and only one output circuit 4 is required for the whole system. The control is easy, the wiring is simple, and the cost is low. Further, the lights 2 can be controlled independently or by groups or altogether. The control modes can be set according to needs. Further, the control equipment and wiring material required for the system of the present invention are less complicated and thus require a low cost. Further, only one output circuit 4 is required regardless of the number of the lights. Installation and maintenance are easy at a low cost.

Although specific embodiments have been illustrated and described, numerous modifications and variations are still possible without departing from the essence of the invention. The scope of the invention is limited by the accompanying claims.

The invention claimed is:

1. A system for collective control of lights comprising a main control device (1) and a plurality of lights (2), characterized in that: the system further comprises a plurality of auxiliary control devices (3) a number of which is equal to that of the lights (2), each said auxiliary control device comprises a transducer (31), an amplifier (32), a decoder (33), and a switch device (34) that are electrically connected in sequence, a main portion of a circuit of the switch device (34) is electrically connected to an associated one of the lights (2) or electrically connected via a switch device having a larger power to the associated one of the lights (2); the main control device (1) comprises a central processor (11), an input/decoder (12), an encoded control signal generating circuit (13), and a main amplifier (16), the input/decoder (12) and the encoded control signal generating circuit (13) are electrically connected to the central processor (11), the encoded control signal generating circuit (13) is electrically connected to the input/encoder (12) and the main amplifier (16); a positive output and a negative output of the main amplifier (16) are connected with each other by a wire to form an output circuit (4), the transducer (31) is coupled with the wire of the output circuit (4), a code number for the light (2) to be controlled is input via the input/encoder (12) to the central processor (11), the central processor (11) controls the encoded control signal generating circuit (13) to generate and output an encoded control signal, when the encoded control signal passes through the wire of the output circuit (4), the transducer (31) of the auxiliary control device (3) in association with the light (2) to be controlled generates a corresponding encoded control signal that is amplified by the amplifier (32) and output to the switch device (34) after decoding by the decoder (33) to control on/off of the switch device (34), thereby collectively controlling on/off and/or current magnitude of each of the lights (2).

2. The system for collective control of lights as claimed in claim 1 wherein the transducer (31) comprises an iron core wound by a coil, and wherein the transducer is parallel to the output circuit (4).

3. The system for collective control of lights as claimed in claim 1 wherein the transducer (31) comprises an iron core wound by a coil, the iron core being annular, the wire of output circuit (4) extending through a center of the annular iron core and extending on a plane orthogonal to a plane on which the iron core lies.

4. The system for collective control of lights as claimed in claim 1 wherein the main control device (1) further comprises a code number setting switch (15) electrically connected to the central processor (11).

5. A system for collective control of lights comprising a main control device (1) and a plurality of lights (2), characterized in that: the system further comprises a plurality of auxiliary control devices (3) a number of which is equal to that of the lights (2), each said auxiliary control device comprises an RC circuit (35), an amplifier (32), a decoder (33), and a switch device (34) that are electrically connected in sequence, a main portion of a circuit of the switch device (34) is electrically connected to an associated one of the lights (2); the main control device (1) comprises a central processor (11), an input/decoder (12), an encoded control signal generating circuit (13), and a main amplifier (16), the input/decoder (12) and the encoded control signal generating circuit (13) are electrically connected to the central processor (11), the encoded control signal generating circuit (13) is electrically connected to the input/encoder (12) and the main amplifier (16); a positive output and a negative output of the main control device (1) are connected with each other by a wire to form an output circuit (4), the RC circuit (35) comprises a resistor (R1) connected in series to the output circuit (4), a code number for the light (2) to be controlled is input via the input/encoder (12) to the central processor (11), the central processor (11) controls the encoded control signal generating circuit (13) to generate and output an encoded control signal current, a voltage drop imparted to the resistor (R1) of the RC circuit (35) of an associated one of the auxiliary control devices (3) is amplified by the amplifier (32) and output to the switch device (34) after decoding by the decoder (33) to control on/off of the switch device (34), thereby collectively controlling on/off and/or current magnitude of each of the lights (2).

* * * * *